March 15, 1966 C. F. BENSON 3,240,543
THRUST BEARING
Original Filed Aug. 17, 1960 2 Sheets-Sheet 1
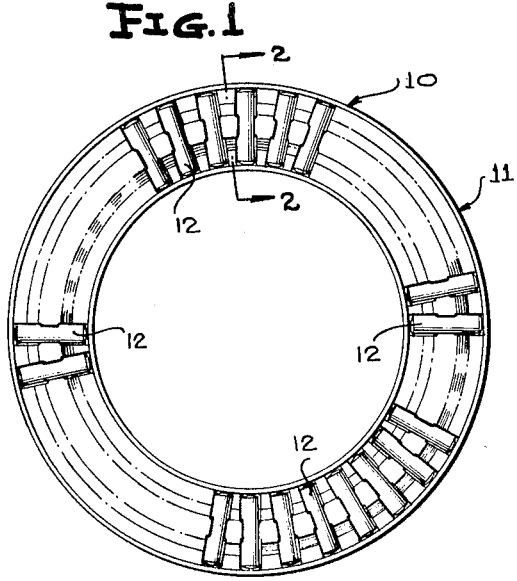
FIG.1
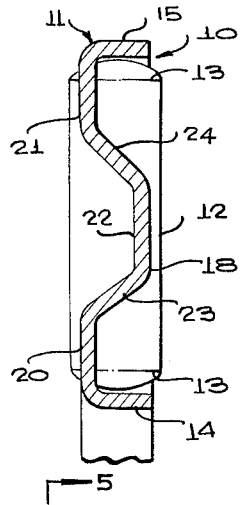
FIG.2
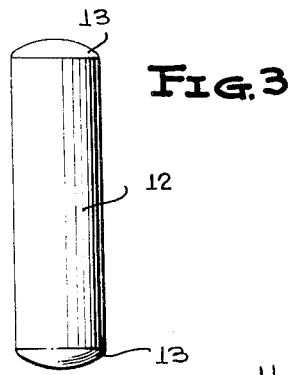
FIG.3
FIG.4
FIG.5
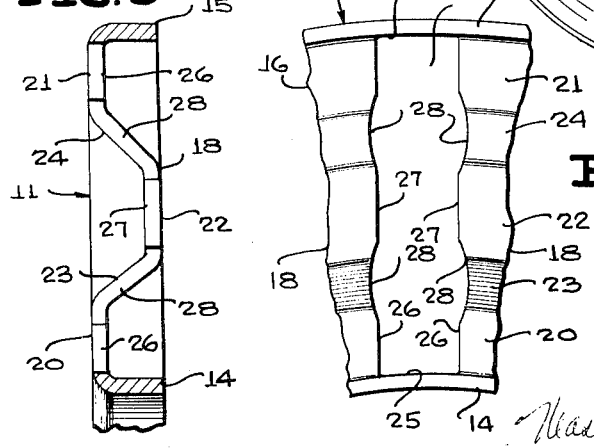
FIG.6
INVENTOR.
CARL F. BENSON
BY
ATTORNEYS March 15, 1966  C. F. BENSON  3,240,543
THRUST BEARING
Original Filed Aug. 17, 1960  2 Sheets-Sheet 2
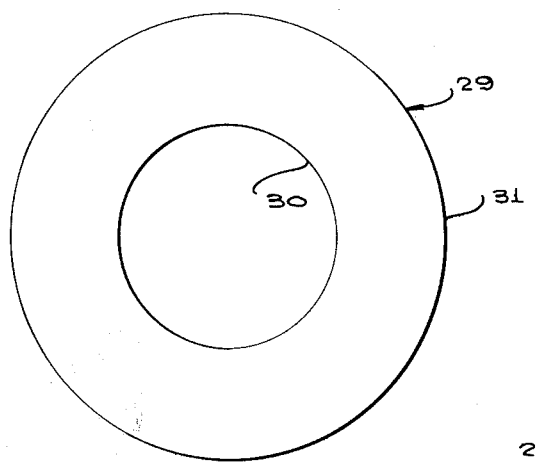
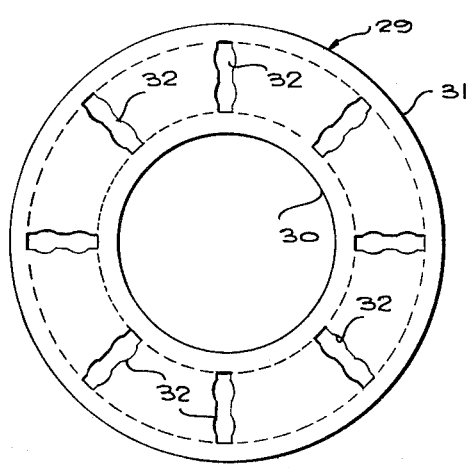
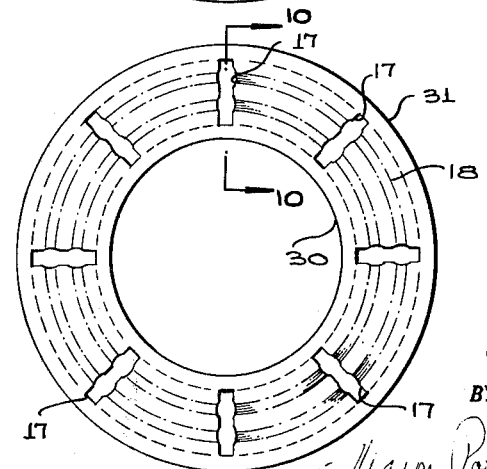
INVENTOR.
CARL F. BENSON
BY
ATTORNEYS

United States Patent Office 3,240,543
Patented Mar. 15, 1966

3,240,543
THRUST BEARING
Carl F. Benson, Torrington, Conn., assignor to The Torrington Company, Torrington, Conn., a corporation of Maine
Continuation of abandoned application Ser. No. 50,220, Aug. 17, 1960. This application July 1, 1964, Ser. No. 379,467
12 Claims. (Cl. 308—235)

This invention relates in general to new and useful improvements in the bearing art, and more particularly relates to a novel thrust bearing. This application constitutes a continuation of my copending application for U.S. Letters Patent, Serial No. 50,220, filed August 17, 1960, and now abandoned.

This invention particularly relates to a flat washer-like thrust bearing of the type utilizing a retainer having a plurality of rollers carried thereby, the rollers projecting from opposite sides of the retainer to engage opposed thrust surfaces.

One of the primary objects of the invention is to provide a simple one-piece retainer for the rollers of a thrust bearing into which the rollers may be readily snapped and wherein no riveting, clinching, spinning or other metal shaping operation is required to retain the rollers within the retainer.

Another object of the invention is to provide a novel one-piece retainer for thrust bearings of the type wherein the rollers thereof are radially disposed, the retainer being bent from sheet metal and having pockets formed therein with portions of the retainer adjacent the pockets overlying the pockets and serving to retain the rollers therein.

Still another object of the invention is to provide a novel thrust bearing of the flat washer-like type, the thrust bearing being formed of a retainer and a plurality of rollers, the retainer being of a one-piece construction and having a plurality of radial pockets therein in which the rollers are snapped, and the removal of the rollers is accomplished by exerting pressure on individual ones of the rollers in opposite direction to that used at the time of assembly, whereby a roller may be readily removed and replaced.

Another object of the invention is to provide a novel retainer for use in retaining rollers in a thrust bearing, the retainer being formed of sheet metal and having a plurality of roller receiving pockets separated by radial bars, each of the bars having an intermediate portion of crown shape wherein each bar is flexible and is capable of absorbing the variation in shrinkage resulting in maintenance of the desired flatness after heating and quenching in a heat treating operation.

A further object of the invention is to provide a novel retainer for forming a thrust bearing of the flat washer-like type, the retainer being of a one-piece construction and being formed from sheet metal, the retainer having an annular intermediate portion with integral inner and outer lips along the edges thereof, the intermediate portion having a plurality of radial pockets, formed therein with the pockets being separated by radial bars extending generally between the inner and outer lips, and each of the bars having an offset intermediate portion with portions of the ends of the bars and portions of the offset intermediate portions projecting into overlying relation with respect to the pockets for holding rollers within the pockets while permitting the free rotation of the rollers about their axes.

With the above and other objects in view that will hereinafter appear, the nature of the invention will be more clearly understood by reference to the following detailed description, the appended claims and the several views illustrated in the accompanying drawing:

In the drawing:

FIGURE 1 is a plan view of the thrust washer and shows the general details thereof.

FIGURE 2 is an enlarged fragmentary sectional view taken along the line 2—2 of FIGURE 1, and shows the specific cross-section of the thrust bearing, including the relationship of one of the rollers with respect to the retainer.

FIGURE 3 is a plan view of one of the rollers and shows the specific details thereof.

FIGURE 4 is a plan view of the retainer of the thrust bearing with the rollers removed therefrom in order to illustrate the general arrangement of the pockets formed in the retainer for receiving the rollers.

FIGURE 5 is an enlarged fragmentary sectional view taken along the section line 5—5 of FIGURE 4, and shows the specific cross-section of the retainer in the area of one of the roller receiving pockets.

FIGURE 6 is an enlarged fragmentary plan view of the intermediate portion of the retainer and shows the specific configuration of the pocket therein for receiving one of the rollers.

FIGURE 7 is a plan view showing the outline of the blank from which the retainer is formed after an initial forming step has been performed thereon.

FIGURE 8 is a plan view similar to FIGURE 7, and shows the blank after the pocket defining openings have been formed therein.

FIGURE 9 is a plan view of the member which is being shaped to define the retainer after intermediate portions of the bars between adjacent pockets have been offset so that each bar has a crown shape.

FIGURE 10 is an enlarged fragmentary sectional view taken through the member of FIGURE 9 along the line 10—10 and shows the cross-section of the member prior to the turning of the peripheral edge portions thereof to define inner and outer lips, the inner and outer lips being shown by dotted lines.

Reference is now made to the drawings, wherein the entire thrust bearing is illustrated in FIGURE 1, and is generally referred to by the numeral 10. The thrust bearing 10 is formed of a retainer; generally referred to by the numeral 11, and a plurality of individual rollers 12. As is best illustrated in FIGURE 2, the rollers 12 project from opposite faces of the retainer 11 for engagement with opposed thrust surfaces (not shown).

Reference is now made to FIGURE 3, wherein the details of one of the rollers 12 are illustrated. It is to be noted that the roller 12 is of a cylindrical form and is provided at the opposite ends thereof with elliptical ends 13. If desired, other roller end configurations may be employed.

Reference is now made to FIGURES 4 and 5, wherein the details of the retainer 11 are best shown. The retainer 11 is of a generally flat washer-like configuration, and is formed of sheet metal. The retainer 11 includes an inner lip 14 and an outer lip 15 with an intermediate portion 16 extending between and being integrally connected to the lips 14 and 15.

The intermediate portion 16 is formed with a plurality of pockets 17, each of the pockets 17 being intended to receive one of the rollers 12. The pockets 17 are spaced apart by radially extending bars 18 which extend generally between the lips 14 and 15.

Referring to FIGURE 5 in particular, it will be seen that each bar 18 includes an end portion 20 disposed adjacent to and integrally connected to the inner lip 14. A similar end portion 21 is disposed adjacent to and is integrally connected to the outer lip 15. The end portions 20, 21 of each bar 18 are flat and lie in a common plane.

Each of the bars 18 also has an intermediate crown portion 22 which includes sloping portions 23 and 24 which are integrally connected to the end portions 20 and 21, respectively. It is to be noted that the crown portion 22 of each bar 18 is disposed generally parallel to the plane of the end portions 20, 21 thereof, but is offset therefrom. All of the crown portions 22 lie in a second plane spaced from the first plane of the end portions 20, 21, the two planes being parallel.

Reference is now made to FIGURE 6 in particular, wherein the shape of the opening of the individual pocket 17 is illustrated. It is to be noted that each of the pockets 17 has a pair of square cut ends 25 and a pair of parallel end side wall portions 26 adjacent each of the ends 25. Each of the pockets 17 also has a pair of parallel central side wall portions 27 which are disposed in alignment with respective ones of the end side wall portions 26. Intermediate the side wall portions 26 and 27, the pocket 17 is defined by a concave side wall portion 28. Thus, the end side wall portions 26 and the central side wall portions 27 project further inwardly into the pockets 17 than other portions of the side walls of each pocket 17. These side wall portions 26, 27 serve to retain a roller 12 in one of the pockets 17 in a manner to be described in detail hereinafter.

It is to be noted that the side wall end portions 26 are aligned with the end portions 20, 21 of respective bars 18. It is also to be noted that the central side wall portions 27 are aligned with the intermediate crown portion 22 of their respective bars 18. Thus, it will be seen that the side wall end portions 26 lie in a plane disposed parallel to the plane in which the central side wall portions 27 lie.

The spacing between the ends 25 of each pocket 17 is greater than the over-all length of each of the rollers 12. Thus, when a roller is snapped into one of the pockets 17, the elliptical ends 13 thereof are free to engage on their highest point with outer diameter lip 15 or inner diameter lip 14, which lips restrict the movement of the roller radially. Also, the spacing between each opposed pair of side wall end portions 26 is less than the diameter of the roller 12. As a result, when the roller 12 is positioned in the pocket 17, movement of the roller 17 beyond the retainer 11 to the left, as viewed in FIGURE 5, is restricted by the side wall end portions 26. Further, the spacing between each pair of central side wall portions 27 being substantially the same as that of each pair of the side wall end portions 26, movement of the roller out of the pocket to the right, as viewed in FIGURE 5, is restricted by the central side wall portions 27.

*Formation of retainer*

The retainer is formed from a single one-piece blank of flat metal. The retainer blank is a washer-shaped piece, circular in outside diameter with a center hole. The blank, which is best illustrated in FIGURE 7, is generally referred to by the numeral 29, the hole is referred to by the numeral 30, and the outside periphery of the blank 29 is referred to by the numeral 31.

Openings 32 are then formed in the blank 29, the openings radiating from the center of the blank 29. The openings 32 correspond in number to the number of pockets 17 of the retainer 11. Also, the openings 32 have a configuration generally conforming to the configuration of the pockets 17, as is generally illustrated in FIGURE 6. However, the openings 32 are elongated as compared to the pockets 17 for a reason which will be apparent hereinafter.

The blank 29 with the openings 32 formed therein is then further shaped by raising the central portions of the bars 18 which extend between each pair of openings 32. The bars, when raised, assume the shape best illustrated in FIGURE 10. In the shaping of the bars 18, the outer diameter of the blank 29 is reduced by being drawn inwardly, and the diameter of the opening 30 is increased by the metal being drawn outwardly. This stretching of the inner and outer portions of the blank 29 minimizes the stretching of the metal in the bars 18 during the shaping of the bars 18. Thus, while the diameter of the opening 30 increases, the peripheral extent of the peripheral edge 31 decreases.

Reference is made to FIGURE 10 wherein it is shown in dotted lines that the inner and outer portions of the blank 29 are bent out of the general plane of the blank 29 to define the upstanding lips 14 and 15. This terminates the metal working operation on the blank 29.

At this time, it is pointed out that the foregoing operations may be performed individually or may be combined by proper tool design into progressive operations in a single tool set.

The conformation of the finished retainer 11 minimizes distortion due to heat treatment if heat treatment, such as carbo-nitriding, is desired. Distortion of washer-like parts is aggravated during quenching when the rate of shrinkage is different between the outer diameter and the inner diameter. This causes the part to twist, and destroys the original flatness of those portions which were in a single plane in the soft state. In the present retainer, the crown shape of each of the bars 18 connecting the inner and outer rims acts as a flexible member which absorbs the variation in shrinkage resulting in maintenance of flatness after quenching. The change in the crown of the bars 18 is so small as not to affect the roll retaining pocket conformation to any appreciable extent.

The ease with which the rollers 12 may be assembled within the retainer 11 is one of the desirable features of the present invention. No riveting, clinching, spinning or other metal shaping operations are required to assemble the rollers and fix them in the pocket 17. The rollers are snapped into the pockets 17 by aligning them over the tops of the pockets and applying pressure in a downward direction to deflect the central side wall portions 27 in a circular direction whereupon the rollers snap into the pockets and are firmly restrained in position while free to rotate about their axes.

Removal of a roller is accomplished by exerting pressure in the opposite direction to that used at the time of assembly.

Assembly of the rollers in the retainer may be simply and economically accomplished by mechanically feeding and presenting the rollers to the pockets and mechanically pressing or rolling the rollers into position in a rapid consecutive operation, as the retainer is being rotated in a horizontal position about its axis. It will be quite obvious that time is saved in assembly with the present bearing due to the elimination of riveting, clinching, spinning or similar metal forming operations required when retainers are made with two or more pieces.

It will be noted that when the rollers are assembled in the retainer, the rollers are seated in the pockets, but at the same time project from opposite faces of the retainer, as is best shown in FIGURE 2. Endwise movement of the rollers is restricted by both the configuration of the pockets and the presence of the rims or lips 14, 15, which lips serve to both restrict the movement of the rollers longitudinally of their axes and to impart rigidity to the retainer. It is to be noted that the axes of the rollers lie in a common plane, which plane is disposed between the planes of the side wall portions 26 and 27 and is parallel to these two planes. Thus, while the rollers are restrained against movement out of the pockets, they are free to engage opposed thrust surfaces (not shown) and to accomplish their desired function as components of the thrust bearing.

From the foregoing, it will be seen that novel and advantageous provision has been made for carrying out the desired end. However, attention is directed to the fact that variations may be made in the example method of forming the bearing as well as in the specific bearing structure disclosed herein without departing from the

I claim:

1. A method of forming a retainer for rollers of a thrust bearing comprising the steps of providing a sheet metal blank, cutting and bending the sheet metal blank to define a washer-like member having an intermediate portion and inner and outer rims with the intermediate portion being in the form of a plurality of roller receiving pockets separated by bars having crown shaped intermediate portions, and then heat treating the shaped member by a heating and quenching operation with the crown shapes of the bars absorbing variations in shrinkage to form the desired hardened retainer.

2. A method of forming a retainer for rollers of a thrust bearing comprising the steps of providing a sheet metal blank, shaping the blank to define a flat annular washer type member, forming a plurality of radial pockets defining openings in the member separated by radial bars, then offsetting the central portions of the bars and thereby reducing the external diameter of the member, and then bending peripheral portions of the member into angular relation to the plane of the member to define inner and outer lips.

3. The method of claim 2 wherein the shaped member is heat treated by a heating and quenching operation with the offset portions of the bars absorbing variations in shrinkage.

4. A method of forming a thrust bearing comprising the steps of providing a sheet metal blank, shaping the blank to define a flat annular washer type member, forming a plurality of radial pocket defining openings in the member separated by radial bars, then offsetting the central portions of the bars and thereby reducing the external diameter of the member, bending peripheral portions of the member into angular relation to the plane of the member to define inner and outer lips to define a retainer, and snapping rollers into the pockets of the retainer.

5. A method of forming a thrust bearing comprising the steps of providing a sheetmetal blank, shaping the blank to define a flat annular washer type member, forming a plurality of radial pocket defining openings in the member separated by radial bars, offsetting the central portions of the bars and thereby reducing the external diameter of the member, bending peripheral portions of the member into angular relation to the plane of the member to define inner and outer lips to define a retainer, then heat-treating the shaped member by a heating and quenching operation with the crown shape of the bars absorbing variation and shrinkage to form the desired hardened retainer, and snapping rollers into the pockets of the retainer.

6. A method of forming a retainer for rollers of a thrust bearing comprising the steps of providing a sheet metal blank, shaping the blank to define a flat annular washer type member, forming a plurality of radial pocket defining openings in the member separated by radial bars, then offsetting the central portions of the bars and thereby reducing the external diameter of the member, and then heat treating the shaped member by a heating and quenching operation with the crown shapes of the bars absorbing variations in shrinkage to form the desired hardened retainer.

7. A method of forming a thrust bearing comprising the steps of providing a sheet metal blank, shaping the blank to define a flat annular washer type member, forming a plurality of radial pocket defining openings in the member separated by radial bars, then offsetting the central portions of the bars and thereby reducing the external diameter of the member, bending peripheral portions of the member into angular relation to the plane of the member to define inner and outer lips to define a retainer, then heat treating the shaped member by a heating and quenching operation with the crown shapes of the bars absorbing variations in shrinkage to form the desired hardened retainer.

8. A method of forming a retainer for rollers of a thrust bearing comprising the steps of providing a sheet metal blank, shaping the blank to define a flat annular washer type member, forming a plurality of radial pocket defining openings in the member separated by radial bars, then offsetting the central portions of the bars and thereby simultaneously reducing the external diameter of the member, increasing the internal diameter of the member, and then heat treating the shaped member by a heating and quenching operation with the crown shapes of the bars absorbing variations in shrinkage to form the desired hardened retainer.

9. A method of forming a thrust bearing comprising the steps of providing a sheet metal blank, shaping the blank to define a flat annular washer type member, forming a plurality of radial pocket defining openings in the member separated by radial bars, then offsetting the central portions of the bars and thereby simultaneously reducing the external diameter of the member, increasing the internal diameter of the member, bending peripheral portions of the member into angular relation to the plane of the member to define inner and outer lips to define a retainer, then heat treating the shaped member by a heating and quenching operation with the crown shapes of the bars absorbing variations in shrinkage to form the desired hardened retainer.

10. A retainer for a flat roller thrust bearing, said retainer being of a one-piece sheet metal construction formed of a metal which is readily surface hardened by heating followed by quenching and having a generally flat washer-like configuration, said retainer including an annular intermediate portion and inner and outer ring-like lips disposed generally normal to the general plane of said intermediate portion, said intermediate portion being primarily defined by a plurality of radially extending bars defining therebetween circumferentially spaced radially extending roller receiving and confining pockets, each of said bars including end portion lying in a first plane and an offset intermediate portion lying in a second plane spaced from and disposed parallel to said first plane, said retainer having the surfaces thereof defined by exposed heat treated hardened outer surface layers, and said bars being flexible whereby forces tending to distort said retainer from its normal flat washer-like configuration are absorbed by said bars during the hardening of said layers by the heat treatment thereof.

11. A flat roller thrust bearing comprising a retainer formed of a single sheet of metal which is readily surface hardened by heating followed by quenching and being of a generally flat washer-like configuration, said retainer including an annular intermediate portion and inner and outer ring-like lips disposed generally normal to the general plane of said intermediate portion, said intermediate portion being primarily defined by a plurality of radially extending bars defining therebetween circumferentially spaced radially extending roller receiving and confining pockets, each of said bars including end portions lying in a first plane and an offset intermediate portion lying in a second plane spaced from and disposed parallel to said first plane, said retainer having the surfaces thereof defined by exposed heat treated hardened outer surface layers, and said bars being flexible whereby forces tending to distort said retainer from its normal flat washer-like configuration are absorbed by said bars during the hardening of said layers by the heat treatment thereof, and a roller seated in each of said pockets and retained therein by said bars, the spacing of said first and second planes being less than the diameter of each roller, and the spacing between opposing bar intermediate portions and opposing bar end portions on opposite sides of each pocket being less than the diameter of the roller seated in the pocket with said rollers being retained in said pockets by said bars.

12. The thrust bearing of claim 11 wherein said rollers have semi-spherical ends engageable with said lips to limit radial movement of said rollers while permitting freedom of rotation thereof.

References Cited by the Examiner

UNITED STATES PATENTS

| | | | |
|---|---|---|---|
| 2,417,559 | 3/1947 | Larson | 308—235 X |
| 2,454,028 | 11/1948 | Baker | 308—235 |
| 2,765,518 | 10/1956 | Lovell | 29—148.4 |
| 2,848,791 | 8/1958 | Neese | 29—148.4 |
| 2,881,036 | 4/1959 | Neese | 308—217 |

FOREIGN PATENTS

| | | |
|---|---|---|
| 1,023,932 | 2/1958 | Germany. |
| 835,356 | 5/1960 | Great Britain. |
| 112,623 | 12/1944 | Sweden. |

DON A. WAITE, *Primary Examiner.*

FRANK SUSKO, *Examiner.*